(12) United States Patent
Owens

(10) Patent No.: US 9,371,079 B1
(45) Date of Patent: Jun. 21, 2016

(54) TRAIN BRAKE TOOL

(71) Applicant: Brian Owens, Flagstaff, AZ (US)

(72) Inventor: Brian Owens, Flagstaff, AZ (US)

( * ) Notice: Subject to any disclaimer, the term of this patent is extended or adjusted under 35 U.S.C. 154(b) by 767 days.

(21) Appl. No.: 13/740,117

(22) Filed: Jan. 11, 2013

(51) Int. Cl.
*B61H 13/02* (2006.01)

(52) U.S. Cl.
CPC ...................... *B61H 13/02* (2013.01)

(58) Field of Classification Search
CPC ................ B25B 27/06; B25B 27/14
See application file for complete search history.

(56) References Cited

U.S. PATENT DOCUMENTS

| 573,945 | A | | 12/1896 | Willard | |
|---|---|---|---|---|---|
| 791,009 | A | | 5/1905 | Cooper | |
| 2,484,278 | A | | 10/1949 | Fisher | |
| 3,072,428 | A | * | 1/1963 | Johnson | B63B 17/00 294/17 |
| 3,843,981 | A | * | 10/1974 | Verest | B25B 25/00 254/131 |
| 4,817,549 | A | | 4/1989 | Beatman | |
| 5,226,718 | A | | 7/1993 | Lin | |
| 5,775,674 | A | * | 7/1998 | Bigham | B66F 15/00 254/130 |
| 6,964,407 | B1 | * | 11/2005 | Butler | B66F 19/005 254/131 |
| 7,401,408 | B1 | * | 7/2008 | Buch | B26B 1/02 30/294 |
| 2002/0062526 | A1 | | 5/2002 | Keldsen | |
| 2005/0268982 | A1 | | 12/2005 | Lile | |

* cited by examiner

*Primary Examiner* — Lee D Wilson
(74) *Attorney, Agent, or Firm* — Invention To Patent Services; Alex Hobson

(57) ABSTRACT

A train brake tool for engaging and disengaging a train brake, such as a brake wheel or lever, is described. The train brake tool is configured for manual or hand operation and has both a puller portion and pusher portion configured at the end of an elongated member. The puller portion is configured with a hook for insertion into an opening in a brake wheel to allow the user to pull and rotate the wheel. The pusher portion has a hook configured oppositely to the puller, to allow the user to push the wheel. A length extension is described and is configured to be detachably attachable to the train brake tool.

17 Claims, 12 Drawing Sheets

TRAIN BRAKE TOOL

BACKGROUND OF THE INVENTION

1. Field of the Invention

The present invention relates to a train brake tool for engaging and disengaging train brakes.

2. Background

When a train is pulled into a station or is parked, it is a requirement that the brakes be applied to each car of the train. This requires manually engaging the brake on each car of the train. The brake wheels may be located in a position that is not easily reached, such as in a high position on the end of a train car, requiring a worker to climb a ladder to a platform to manually tighten the brake wheel. In addition, brake wheels may be located toward one side of the train car and require a worker to climb a ladder and traverse across a platform in order to reach the brake wheel. Workers are not allowed to stand on the tracks to elevate themselves to reach a brake wheel, as this is a safety violation. When a train is ready to depart, all of the brake have to be disengaged. The brake wheels may be released and in some cases, a brake release lever may be manually repositioned to release the brake. Engaging and disengaging the bakes is very time consuming, laborious, and can be dangerous, especially in wet or icy conditions.

SUMMARY OF THE INVENTION

The invention is directed to a train brake tool for engaging and disengaging a train brakes. The train brake tool, as described herein, is configured for manual or hand operation and is a hand tool. The train brake tool comprises an elongated member with a brake adjustment portion located on an extended end from the handle end, and is configured for engaging and disengaging train brakes. The brake adjustment portion of the tool comprises a puller and a pusher. The puller comprises a puller hook portion and a puller extension having a puller extended end. The puller extension extends back from the puller hook portion toward the handle end at an angle of at least 120 degrees from the tool length axis. The pusher extension extends forward from the puller hook portion away from the handle end at an angle of at least 120 degrees from the tool length axis. The puller and pusher are configured for coupling with a train brake wheel, wherein the brake adjustment portion is configured on a tool end, wherein the tool end is located on an opposing end to the handle end of the train brake tool and coupled to the elongated member.

The train brake tool has a tool length from the handle end to the furthest extended brake adjustment portion, and a tool length position that is measured from the handle end along the tool length axis, wherein the tool length is 10 inches or more. The tool length may be any suitable length including, but not limited to 6 inches or more, 8 inches or more, 15 inches or more 20 inches or more, 30 inches or more, 50 inches or more and any length range between and including the length values provided.

In one embodiment, the puller extended end has a length position that is no less than the length position of the pusher hook portion. In another embodiment, the puller extended end has a length position that is less than the length position of the pusher hook portion. In still another embodiment, the puller extended end has at a length position that is substantially the same as the length position of the pusher hook portion. The puller hook portion may be the most extended portion from handle end of the train brake tool.

In one embodiment, the pusher extension extends forward from the puller hook portion away from the handle end at an angle of at least 120 degrees from the tool length axis. In an exemplary embodiment, the pusher extended end has a length position that is no greater than the length position of the puller hook portion. In yet another embodiment, the pusher extended end has a length position that is greater than the length position of the puller hook portion. In still another embodiment, the pusher extended end is at a length position that is substantially the same as the length position of the puller hook portion. The pusher extended end may be the most extended portion from the handle end of the train brake tool.

The train brake tool as described herein may comprise any suitable handle on the handle end. It is to be understood that the handle may be positioned substantially near the handle end and may not cover the handle end of the train brake tool. The handle may be a separate part of the train brake tool that is slid over or otherwise attached to the elongated member, or it may be an integral handle and be molded with the elongated member.

The train brake tool as described herein may comprise a length extension having an extension length that is configured to be detachably attached to the elongated member at the handle end. The elongated member and or the length extension may comprise threads for coupling the two parts together. For example, the elongated member may comprise male threads and the length extension may comprise female threads. In another embodiment, a ball attachment feature may be incorporated into the elongated member and length extension for detachably attaching the two parts. For example, the elongated member may comprise a ball and the length extension may comprises an opening configured to receive the ball and attach the two parts together. Any suitable number of ball adjustment features may be used.

A length extension may be coupled to the train brake tool for easy transport. A train brake tool may comprise a transport coupling feature, whereby the length extension is configured to be coupled to the elongated member with a substantial portion of the length extension length overlapping the elongated member length. One or more clips or other suitable transport coupling features may be used to couple the length extension to the train brake tool. In an exemplary embodiment, a coupling feature comprises a length extension cavity extending a substantial portion of the length extension length, whereby the cavity is configured for insertion of the elongated member, such that a substantial portion of the length extension length overlaps the elongated member length. A length extension having a cavity for insertion of the elongated member may be detachably attached to the train brake tool by any suitable means including, threads, or a ball attachment feature for example.

The train brake tool may be made out of any suitable material including, but not limited to, metal, plastic, composites, and the like. It is preferable that the train brake tool be lightweight and also durable In an exemplary embodiment, a train brake tool is made substantially of lightweight metal, such as aluminum, and in particular substantially out of aluminum tubing. A train brake tool, or any portion thereof may have any suitable outside cross-sectional shape including, but not limited to, round or circular, oval, square, rectangular, polygonal and the like. In a preferred embodiment, the train brake tool is made substantially of tubular materials, or hollow materials, thereby reducing the weight. In a preferred embodiment, the elongated member has a round outside shape and is made from tubular metal materials. In still another preferred embodiment, the puller is an integral part of the elongated member, whereby they are made out of single piece of material as shown and described herein.

The puller and pusher may be configured at any orientation around the tool length axis of the elongated member including, substantially 180 degrees from each other, no more than 120 degrees from each other, no more than 90 degrees from each other and any range between and including the values provided. The tool end may consist only of a pusher and puller as described herein.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention

DETAILED DESCRIPTION OF THE ILLUSTRATED EMBODIMENTS

Figure 1:
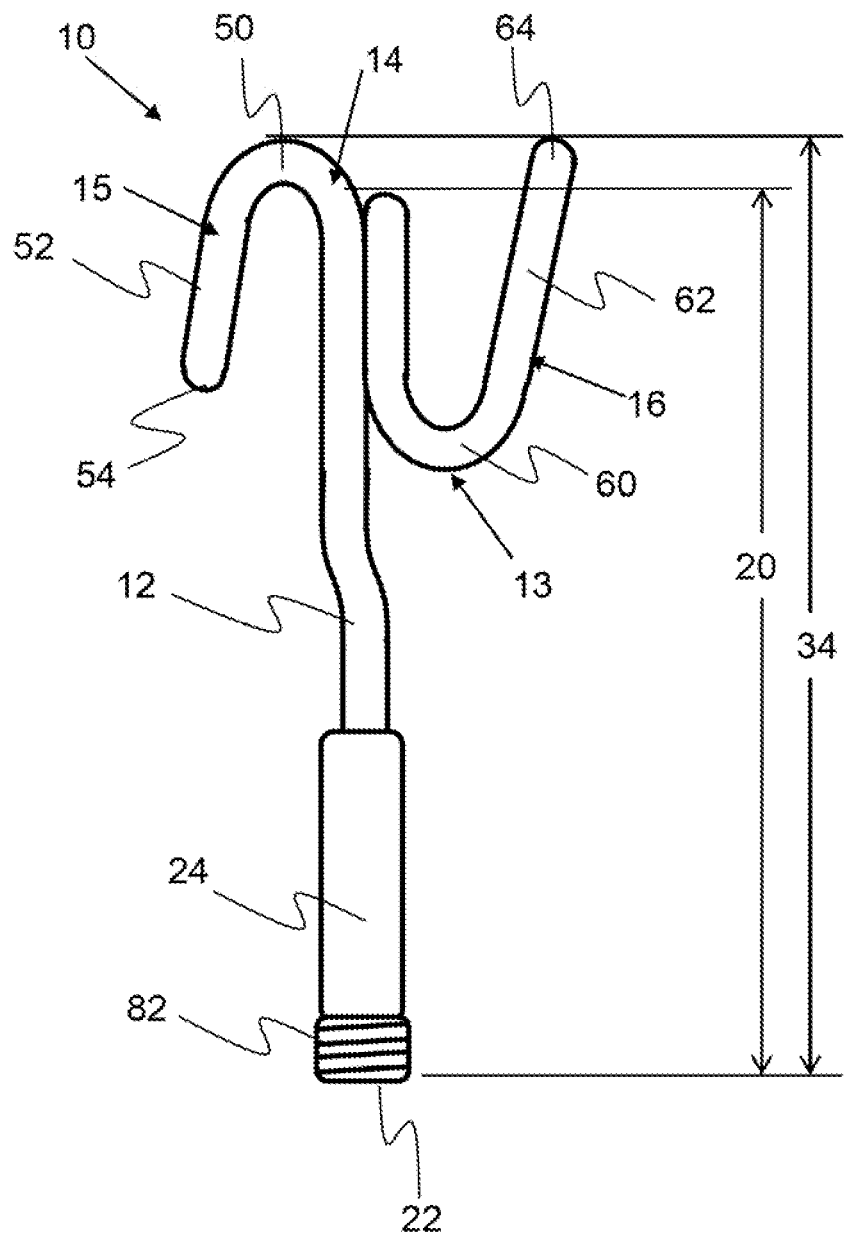

FIG. 1 shows a side view of an exemplary train brake tool as described herein.

Figure 2:
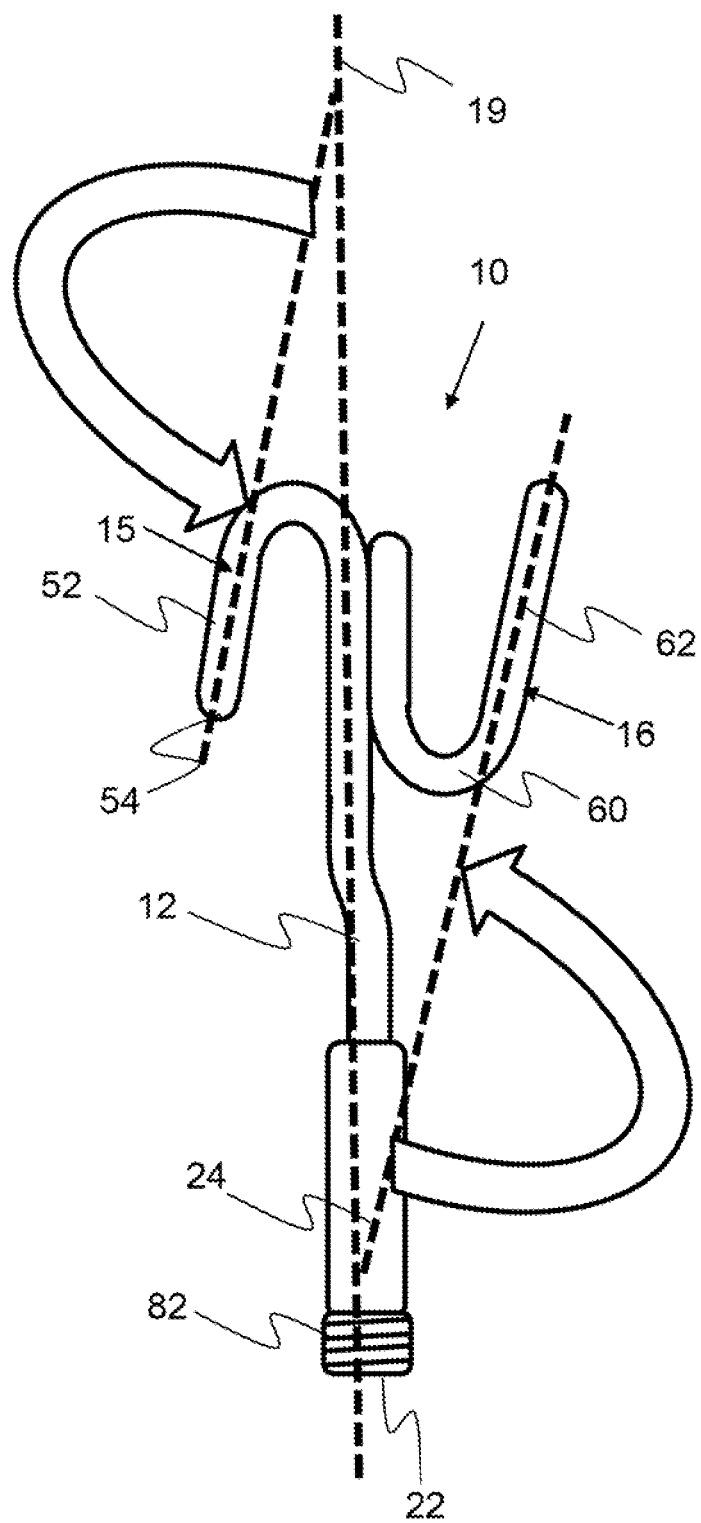

FIG. 2 shows a side view of an exemplary train brake tool as described herein and the angles of the puller and pusher extension from the elongated member.

Figure 3:
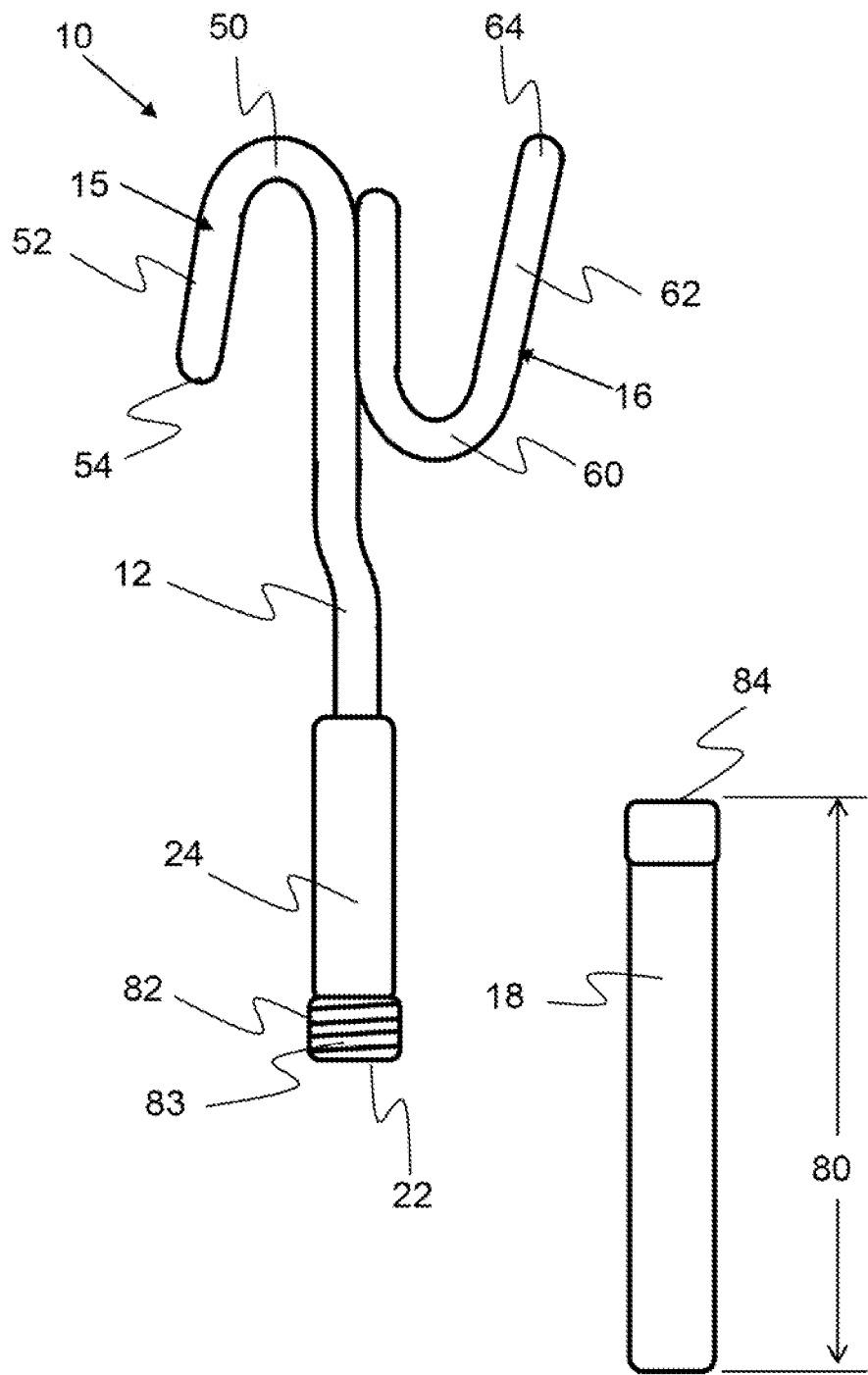

FIG. 3 shows a side view of an exemplary train brake tool having a length extension as described herein.

Figure 4:
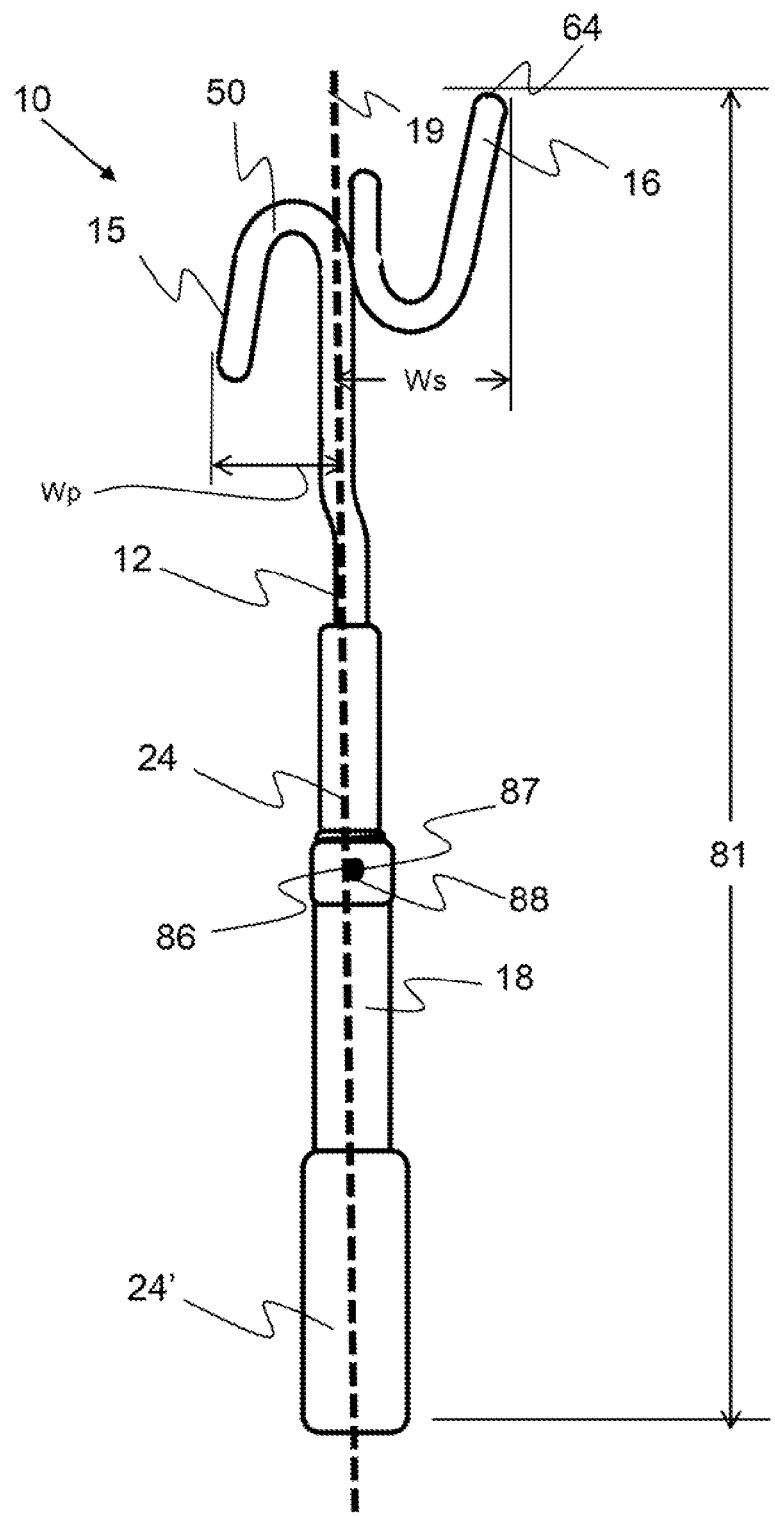

FIG. 4 shows a side view of an exemplary train brake tool having a length extension attached as described herein.

Figure 5:
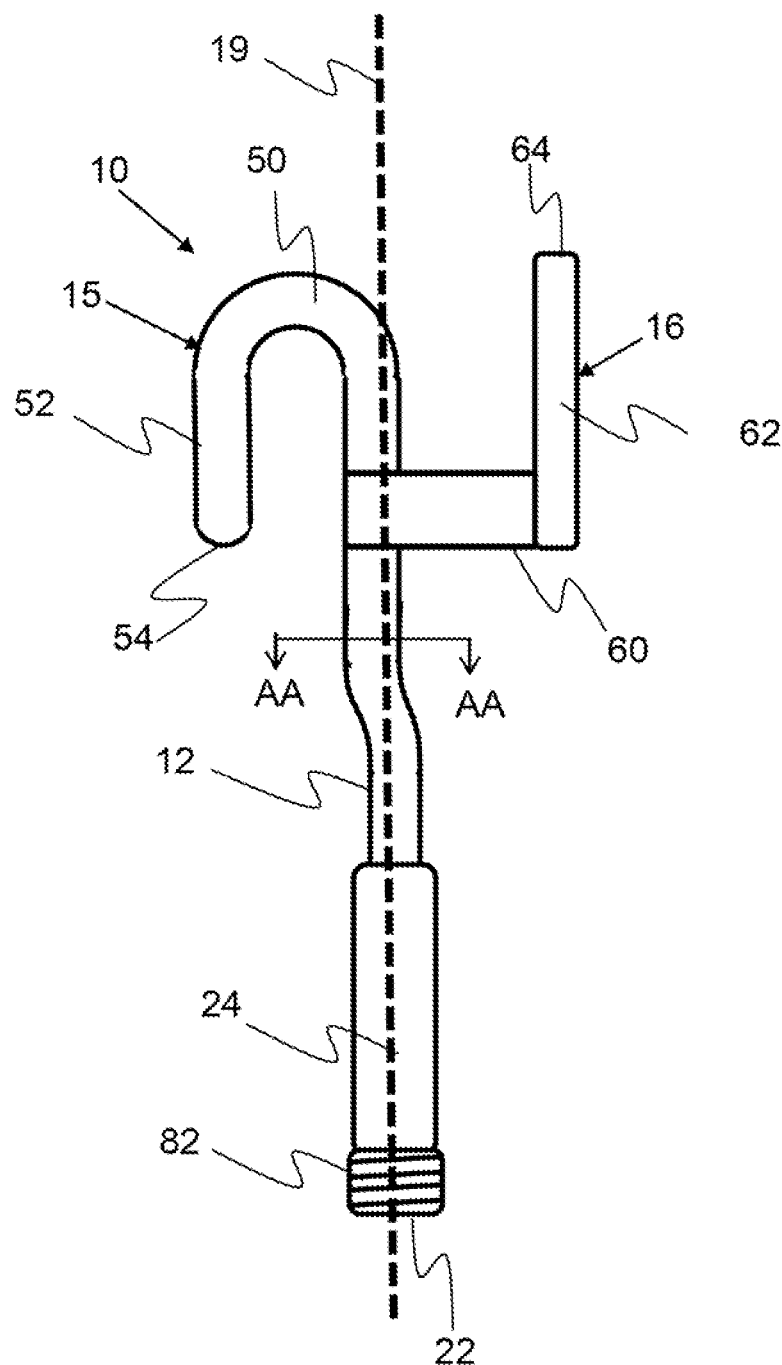

FIG. 5 shows a side view of an exemplary train brake tool as described herein.

Figure 6A:
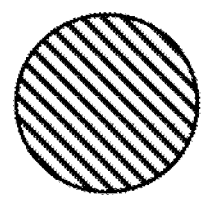
Figure 6B:
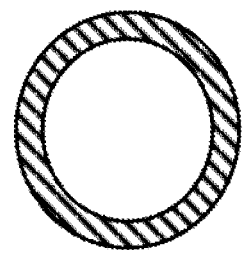
Figure 6C:
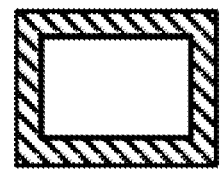

FIGS. 6A-6C show cross-section views of the train brake tool taken along line AA of FIG. 5.

Figure 7:
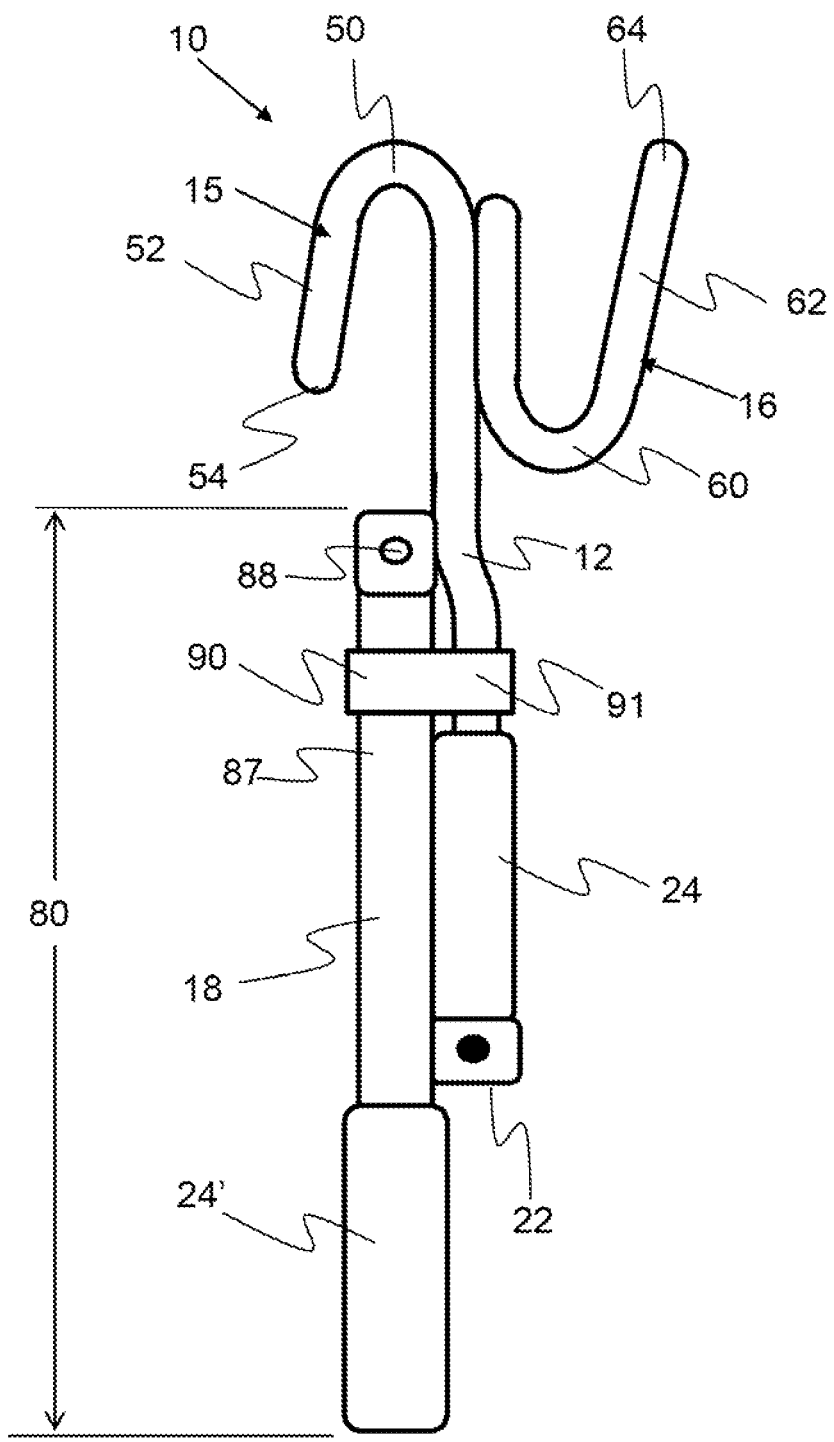

FIG. 7 shows a side view of an exemplary train brake tool having a length extension coupled to the train brake tool as described herein.

Figure 8:
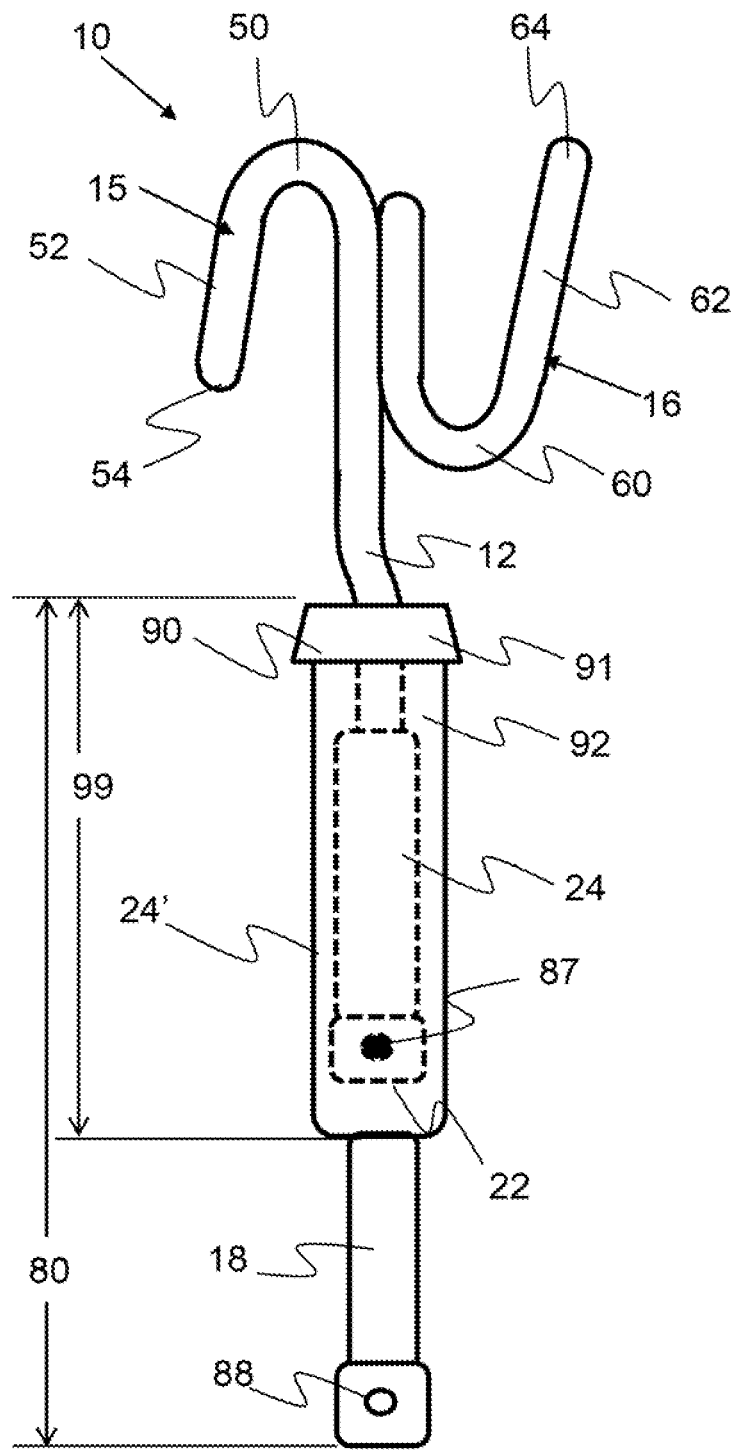

FIG. 8 shows a side view of an exemplary train brake tool having a length extension coupled to the train brake tool as described herein.

Figure 9:
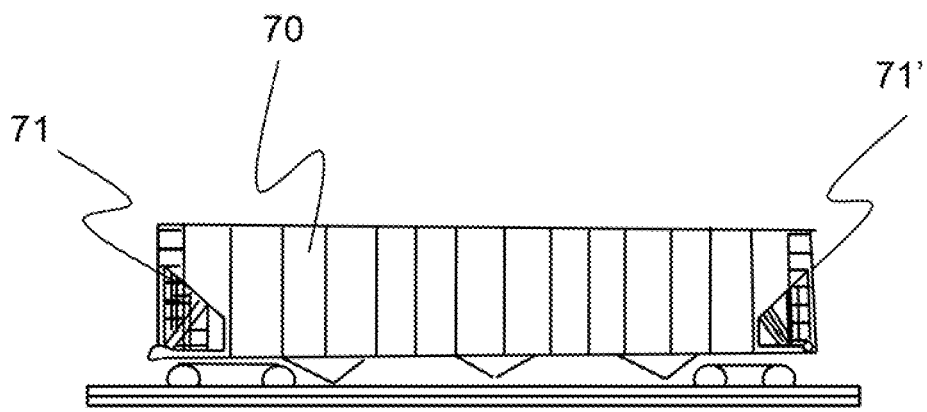

FIG. 9 shows a side view of a train car.

Figure 10:
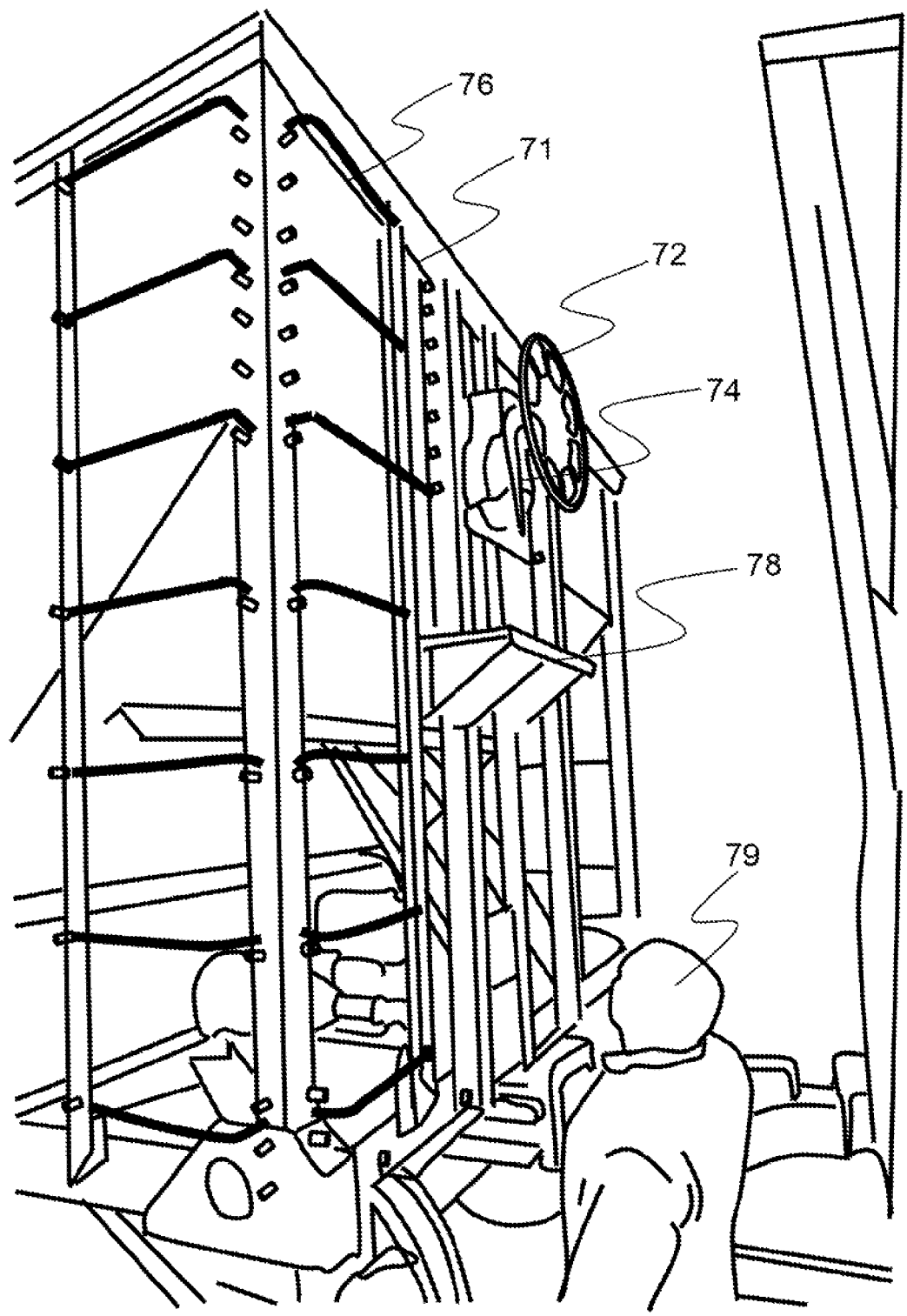

FIG. 10 shows an isometric view of a train car having a train brake wheel configured at the top of the end of the train brake car.

Figure 11:
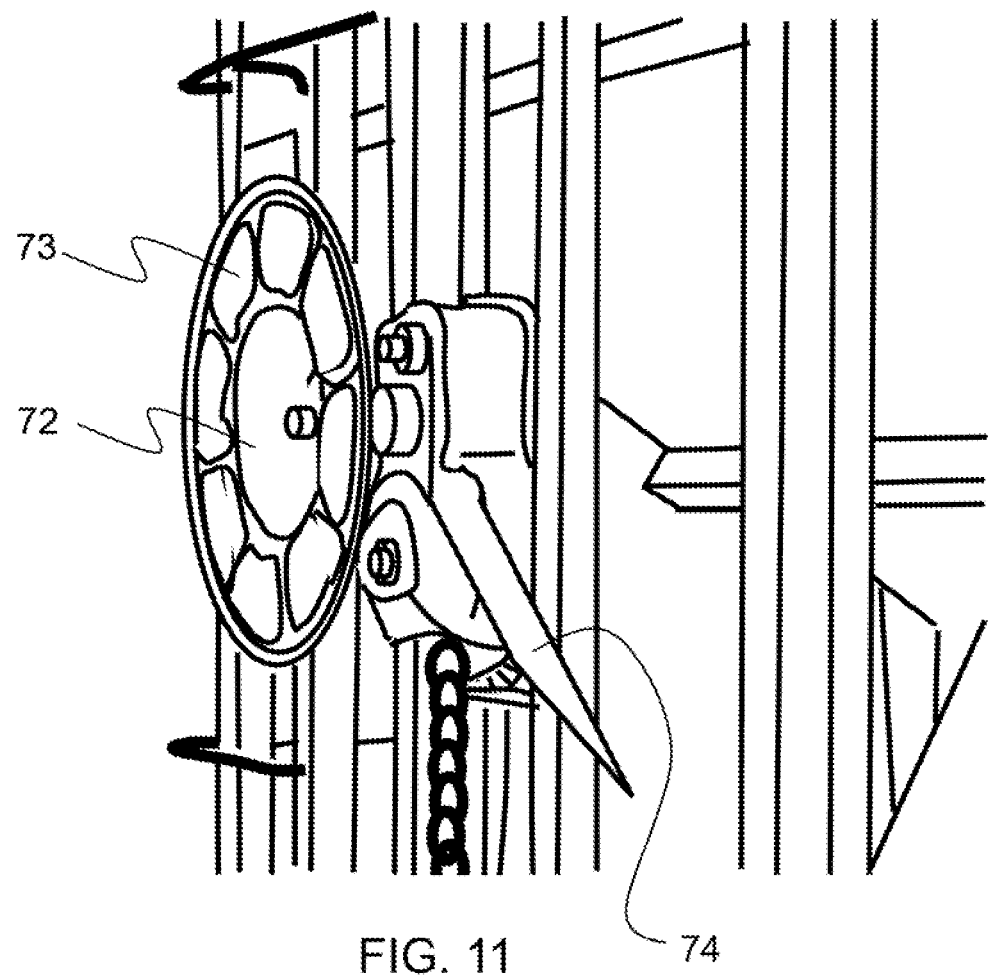

FIG. 11 shows an isometric view of a train brake wheel and release lever.

Figure 12:
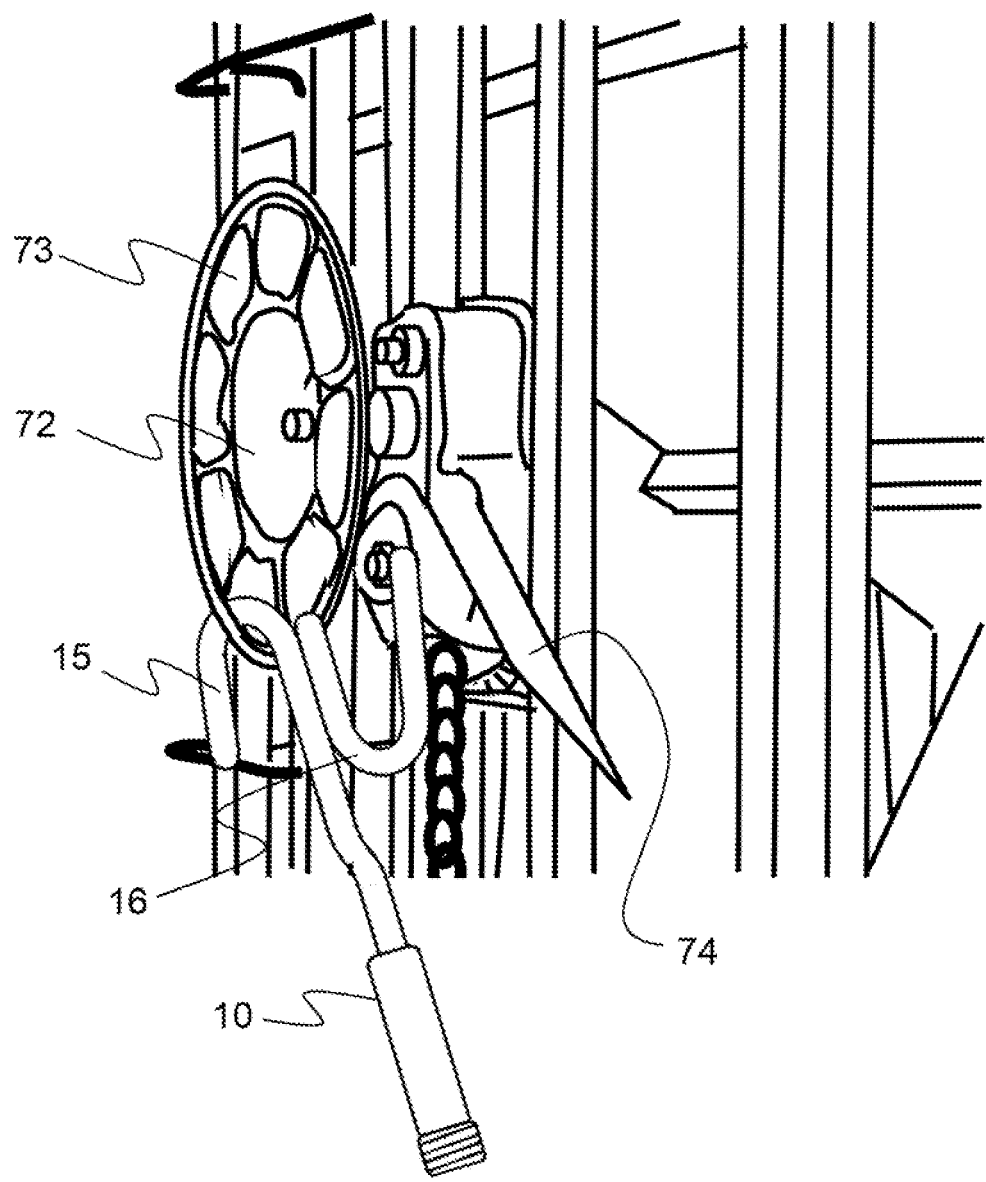

FIG. 12 shows an isometric view of a train brake tool engaging a train brake wheel as described herein.

Figure 13:
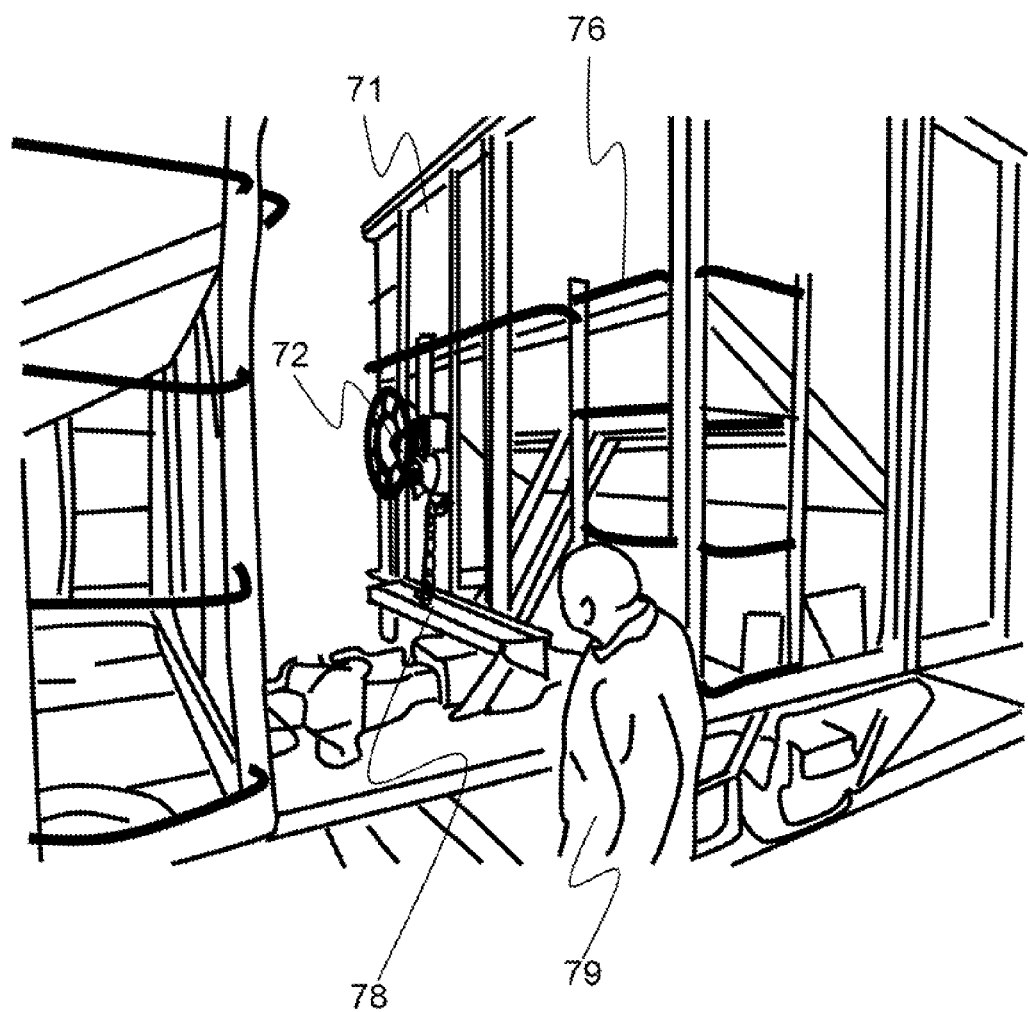

FIG. 13 shows an isometric view of a train car having a train brake wheel configured at an opposing side of the train car from a worker.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown if FIG. 1, the train brake tool 10 comprises a brake adjustment portion 14 configured on one end of the elongated member 12, and a handle end 22. The brake adjustment portion comprises a puller 15 and a pusher 16. The puller 15 has a hook portion 50, a puller extension 52 and a puller extended end 54. Likewise, the pusher comprises a pusher hook portion 60, a pusher extension 62 and a pusher extended end 64. The puller and pusher are configured for insertion into a train brake wheel opening and spinning the wheel to either engage or disengage the brakes. The train brake tool as shown in FIG. 1 has a tool length 34 from the handle end 22 to the furthest most extended portion of the brake adjustment portion 14 and a tool length position that is measures along the tool length axis from the handle end. As shown in FIG. 1, the length position of the most extended portion of the pusher extended end 64 is substantially the same as the length position of the most extended portion of the puller hook portion 50, as indicated by the upper length 34 dimension line. In an exemplary embodiment, the tool end of the train brake tool consists only of a pusher 15 and puller 15 and no other portion has a length position greater than a pusher or puller portion. As shown in FIG. 1, the tool end 13 is couple to one end of the elongated member 12 and the handle end 22, at the other end of the elongated member, comprises a handle 24 and threads 82. The elongated member length 20 extends from the handle end 22 to the puller hook portion 50 and the pusher extended end 64. It is to be understood that the elongated member may comprise any number of parts that may be attached together. For example, an elongated member may comprise a metal bar that is coupled to a separate handle 24.

As shown in FIG. 2, the puller extension 52 extends back from the puller hook portion 50 toward the handle end 22 at an angle of at least 120 degrees from the tool length axis 19 as indicated by the arced arrow. The line for determining this angle extends parallel with the length of the puller extension portion and intersects with the tool length axis. The pusher extension 62 extends forward from the pusher hook portion 60 away from the handle end 22 at an angle of at least 120 degrees from the tool length axis 19 as indicated by the arced arrow. The line for determining this value extends along parallel with the length of the pusher extension portion and intersects with the tool length axis.

As shown in FIG. 3, an exemplary train brake tool 10 may comprises a length extension 18 that is configured to be detachably attached to the train brake tool 10 at the handle end 22. The length extension shown in FIG. 3, comprises female threads 84 that may be attached to, such as by screwing them onto, the male threads 83 configured on the handle end 22. Any suitable type of threads 82 may be used and male threads may be configured on the length extension. The length of the length extension 80 may be any suitable length such as, greater than about 4 inches, greater than about 6 inches, greater than about 8 inches, greater than about 12 inches, greater than about 16 inches, greater than about 20 inches and any range between and including the values provided.

As shown in FIG. 4, an exemplary train brake tool 10 has a length extension 18 attached with a ball attachment feature 86 comprising a ball 87 on the handle end of the elongated member and an opening 88 in the length extension 18. The length extension may simply be slid onto the train brake tool 10, and the opening 88 may be aligned with the ball 87 to attach the length extension to the elongated member 12. The pusher extended end 64 has a greater length position than the puller hook portion 50, as it extends further away from the handle end as measured along the tool length axis. Also shown in FIG. 4 is the width Ws of the pusher 16 as measured from the center of the elongated member 12 to the most extended portion of the pusher perpendicular to the tool length axis 19. Likewise, the width of the puller Wp is measured from the center of the elongated member 12 to the most extended portion of the pusher perpendicular to the tool length axis 19. The width of the puller and pusher may be any suitable value including, but not limited to, greater than about 1 inches, greater than about 2 inches, greater than about 3 inches greater than about 4 inches, greater than about 6 inches and any range between and including the values provided. The tool length axis 19, is shown as a line extending from the center of the handle along the elongated member and substantially centered between the pusher and puller.

As shown in FIG. 5, the exemplary train brake tool 10 comprises a puller 15 having a puller extension portion 52 configured at 180 degrees from the tool length axis whereby the puller extension portion is substantially parallel with the tool length axis. The puller comprises a rounded hook portion 52. The pusher comprises a more angular and non-rounded hook portion 60. The pusher extension portion 63 is also configured at 180 degrees from the tool length axis.

As shown in FIGS. 6A-6C, the train brake tool 10 may be made out of materials having a variety of cross-section shapes. FIG. 6A shows a circular shape, FIG. 6B a tubular shape, and FIG. 6C a hollow rectangular shape. In a preferred embodiment, substantially all of the train brake tool is made out of tubular material, thereby reducing weight. Substantially all, as used in the preceding sentence means that the elongated member, and train brake portion of the tool are made from tubular material having a hollow center portion and that the handle and other components may be made out of other materials.

As shown in FIG. 7, a length extension 18 is coupled to the train brake tool 10 by a clip 91 type transport coupling feature 90. As shown in FIG. 7, the length extension comprises a handle 24' that may be used for holding and using the tool with the length extension in the transport coupled orientation as shown. If additional length is required, the length extension could be attached to the handle end 22. As shown in FIG. length extension serves as the primary handle for the train brake tool, in either the transport configuration as shown, or when attached to the handle end 22. The train brake tool shown in FIG. 7 could be used without the length extension whereby the length extension could be detached from the train brake tool. As shown in FIG. 7, the length extension 18 is configured a substantial portion of the length extension length 80 overlapping the elongated member length.

As shown in FIG. 8, a length extension 18 is coupled to the train brake tool 10 by a cavity 92 and clip 91 type transport coupling feature 90. A portion of the elongated member 12 is configured within the cavity 92 and the length extension is held in place by clip 91. The length extension cavity length 99 extends a substantial portion, or at least 50 percent of the length of the length extension 80. In addition, as shown in FIG. 7, the length extension 18 is couple to the train tool 10 such that a substantial portion of the length extension length overlaps the elongated train tool length.

As shown in FIG. 9, a train car 70 has a two end 71 and 71'. A train brake wheel may be on either or both ends of the train car.

As shown in FIG. 10, a worker 79 is looking up at a train brake wheel 72 positioned at the top of the end of the train car 71. The worker would have to climb up the ladder 76, and position himself on the platform 78 to manually adjust the brake wheel 72 or brake lever 74. This is very strenuous and dangerous is wet and icy conditions.

As shown in FIG. 11, a train brake wheel 72 comprises a plurality of opening 73, whereby a train brake tool as described herein may be engaged. The train brake lever 74 is more clearly shown in FIG. 11 as well.

As shown in FIG. 12, an exemplary train brake tool 10 as described herein is inserted through one of the opening 73 in the train brake wheel 72. A worker could pull on the train brake tool 10 to spin the brake wheel. The puller 15 is inserted through an opening as shown in FIG. 12. Likewise, a worker could insert the pusher 16 into an opening and push the wheel to either engage or release the brake.

As shown in FIG. 13, a train brake wheel 72 is located on an opposing side of the train end 71 from the worker 79. The worker would have to climb up the ladder 76 and traverse across the platform 78 to reach the train brake wheel 72. A train brake tool as described herein would allow the worker to engage or disengage the train brake.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A train brake tool comprising:
   a. an elongated member having a length extending from a handle end; and
   b. a brake adjustment portion comprising:
      i. a puller comprising a puller hook portion and a puller extension having an puller extended end;
      ii. a pusher comprising a pusher hook portion and a pusher extension having a pusher extended end;
   wherein the puller and pusher are configured for coupling with a train brake wheel, wherein the brake adjustment portion is configured on a tool end, wherein the tool end is located on an opposing end to the handle end of the train brake tool and coupled to the elongated member; and
   c. a length extension having an extension length that is configured to be detachably attached to the elongated member at the handle end, wherein the elongated member and the length extension comprise threads for attachment of the length extension to the elongated member.

2. The train brake tool of claim 1, further comprising a tool length from the handle end to the furthest extended brake adjustment portion, and a tool length position that is measured from the handle end along a tool length axis, wherein the tool length is 10 inches or more.

3. The train brake tool of claim 2, wherein the puller extension extends back from the puller hook portion toward the handle end at an angle of at least 120 degrees from the tool length axis.

4. The train brake tool of claim 3, wherein the puller extended end has a length position that is no less than the length position of the pusher hook portion.

5. The train brake tool of claim 3, wherein the puller extended end has a length position that is substantially the same as the length position of the pusher hook portion.

6. The train brake tool of claim 2, wherein the pusher extension extends forward from the puller hook portion away from the handle end at an angle of at least 120 degrees from the tool length axis.

7. The train brake tool of claim 6, wherein the pusher extended end has a length position that is no greater than the length position of the puller hook portion.

8. The train brake tool of claim 6, wherein the pusher extended end has a length position that is greater than the length position of the puller hook portion.

9. The train brake tool of claim 6, wherein the pusher extended end has a length position that is substantially the same as the length position of the puller hook portion.

10. The train brake tool of claim 1, further comprising a handle located on the handle end.

11. The train brake tool of claim 1, wherein the elongated member and the length extension comprise a ball attachment feature for attachment of the length extension to the elongated member.

12. The train brake tool of claim 1, further comprising a transport coupling feature, whereby the length extension is configured to be coupled to the elongated member with a substantial portion of the length extension length overlapping the elongated member length.

13. The train brake tool of claim 12, wherein transport coupling feature comprises a length extension cavity extending a substantial portion of the length extension length, and wherein the cavity is configured for insertion of the elongated member, such that a substantial portion of the length extension length overlaps the elongated member length.

14. The train brake tool of claim 1, wherein train brake tool consists essentially of metal having a substantially circular outer geometry.

15. The train brake tool of claim 1, wherein puller is integrally configured with the elongated member, whereby the puller and elongated member are the same piece of material.

16. The train brake tool of claim 1, wherein train puller and pusher are configured substantially at 180 degrees from each other on opposing sides of the elongated member.

17. A train brake tool, comprising:
   a. an elongated member having a length extending from a handle end; and
   b. a brake adjustment portion comprising:
      i. a puller comprising a puller hook portion and a puller extension having an puller extended end;
      ii. a pusher comprising a pusher hook portion and a pusher extension having a pusher extended end;
   wherein the puller and pusher are configured for coupling with a train brake wheel, wherein the brake adjustment portion is configured on a tool end, wherein the tool end is located on an opposing end to the handle end of the train brake tool and coupled to the elongated member; and
   c. a length extension having an extension length that is configured to be detachably attached to the elongated member at the handle end,
   wherein the elongated member and the length extension comprise a ball attachment feature for attachment of the length extension to the elongated member.

* * * * *